United States Patent
Garvey et al.

(10) Patent No.: US 12,131,142 B2
(45) Date of Patent: Oct. 29, 2024

(54) ARTIFICIAL INTELLIGENCE DRIVEN CONFIGURATION MANAGEMENT

(71) Applicant: Oracle International Corporation, Redwood Shores, CA (US)

(72) Inventors: Dustin Garvey, Exeter, NH (US); Amit Ganesh, San Jose, CA (US); Uri Shaft, Fremont, CA (US); Prasad Ravuri, San Jose, CA (US); Long Yang, Redwood City, CA (US); Sampanna Shahaji Salunke, Dublin, CA (US); Sumathi Gopalakrishnan, Fremont, CA (US); Timothy Mark Frazier, Livermore, CA (US); Shriram Krishnan, Oakland, CA (US)

(73) Assignee: Oracle International Corporation, Redwood Shores, CA (US)

( * ) Notice: Subject to any disclaimer, the term of this patent is extended or adjusted under 35 U.S.C. 154(b) by 3 days.

(21) Appl. No.: 17/332,649

(22) Filed: May 27, 2021

(65) Prior Publication Data

US 2021/0286611 A1     Sep. 16, 2021

Related U.S. Application Data

(63) Continuation of application No. 16/854,635, filed on Apr. 21, 2020, now Pat. No. 11,023,221, which is a
(Continued)

(51) Int. Cl.
*G06F 8/65* (2018.01)
*G06F 8/60* (2018.01)
(Continued)

(52) U.S. Cl.
CPC .......... *G06F 8/65* (2013.01); *G06F 8/60* (2013.01); *G06F 8/61* (2013.01); *G06F 9/5055* (2013.01);
(Continued)

(58) Field of Classification Search
None
See application file for complete search history.

(56) References Cited

U.S. PATENT DOCUMENTS 6,363,495 B1 *  3/2002  MacKenzie ......... H04L 41/0893
                                                                714/37
6,801,937 B1 * 10/2004  Novaes ................. H04L 69/329
                                                                709/227
(Continued)

FOREIGN PATENT DOCUMENTS

CN      103907091 A      7/2014
CN      104904161 A      9/2015
(Continued)

OTHER PUBLICATIONS

Berral et al., "Power-aware Multi-DataCenter Management using Machine Learning," IEEE, 2013, 10pg. (Year: 2013).*
(Continued)

*Primary Examiner* — Ryan D. Coyer
(74) *Attorney, Agent, or Firm* — Invoke

(57) ABSTRACT

Techniques for artificial intelligence driven configuration management are described herein. In some embodiments, a machine-learning process determines a feature set for a plurality of deployments of a software resource. Based on varying values in the feature set, the process clusters each of the plurality of deployments into a cluster of a plurality of clusters. Each cluster of the plurality of clusters comprises one or more nodes and each node of the one or more nodes corresponds to at least a subset of values of the feature set that are detected in at least one deployment of the plurality of deployments of the software resource. The process determines a representative node for each cluster of the plurality of clusters. An operation may be performed based on the representative node for at least one cluster.

20 Claims, 11 Drawing Sheets

Related U.S. Application Data continuation of application No. 16/042,971, filed on Jul. 23, 2018, now Pat. No. 10,664,264.

(60) Provisional application No. 62/566,235, filed on Sep. 29, 2017.

(51) Int. Cl.
*G06F 8/61* (2018.01)
*G06F 9/50* (2006.01)
*G06F 16/906* (2019.01)
*G06N 5/022* (2023.01)
*G06N 20/00* (2019.01)

(52) U.S. Cl.
CPC ........... *G06F 16/906* (2019.01); *G06N 20/00* (2019.01); *G06N 5/022* (2013.01)

(56) References Cited

U.S. PATENT DOCUMENTS

| | | | |
|---|---|---|---|
| 7,020,695 B1* | 3/2006 | Kundu | H04L 67/1097 709/223 |
| 7,711,121 B2* | 5/2010 | Hunt | H04L 41/0659 380/278 |
| 7,739,143 B1 | 6/2010 | Dwarakanath et al. | |
| 7,739,284 B2 | 6/2010 | Aggarwal et al. | |
| 7,783,510 B1 | 8/2010 | Gilgur et al. | |
| 7,987,106 B1 | 7/2011 | Aykin | |
| 8,200,454 B2 | 6/2012 | Dorneich et al. | |
| 8,229,876 B2 | 7/2012 | Roychowdhury | |
| 8,234,236 B2 | 7/2012 | Beaty et al. | |
| 8,261,295 B1* | 9/2012 | Risbood | H04L 41/5012 717/177 |
| 8,363,961 B1 | 1/2013 | Avidan et al. | |
| 8,576,964 B2 | 11/2013 | Taniguchi et al. | |
| 8,583,649 B2 | 11/2013 | Ailon et al. | |
| 8,635,328 B2 | 1/2014 | Corley et al. | |
| 8,694,969 B2 | 4/2014 | Bernardini et al. | |
| 8,880,525 B2 | 11/2014 | Galle et al. | |
| 9,053,171 B2 | 6/2015 | Ailon et al. | |
| 9,147,167 B2 | 9/2015 | Urmanov et al. | |
| 9,265,859 B2* | 2/2016 | Gibson | A61L 27/46 |
| 9,330,119 B2 | 5/2016 | Chan et al. | |
| 9,355,357 B2 | 5/2016 | Hao et al. | |
| 9,420,513 B1* | 8/2016 | Yalagandula | H04W 24/00 |
| 9,495,395 B2 | 11/2016 | Chan et al. | |
| 9,514,213 B2 | 12/2016 | Wood et al. | |
| 9,692,662 B2 | 6/2017 | Chan et al. | |
| 9,710,493 B2 | 7/2017 | Wang et al. | |
| 10,496,926 B2* | 12/2019 | Florissi | G06N 5/022 |
| 10,936,376 B2* | 3/2021 | Gong | G06F 9/5083 |
| 2003/0224344 A1 | 12/2003 | Shamir et al. | |
| 2004/0122797 A1 | 6/2004 | Mishra et al. | |
| 2005/0278445 A1* | 12/2005 | Quang | H04L 67/1095 709/221 |
| 2005/0289538 A1* | 12/2005 | Black-Ziegelbein | G06F 8/61 717/177 |
| 2007/0050497 A1* | 3/2007 | Haley | H04L 43/0817 709/224 |
| 2009/0282133 A1 | 11/2009 | Walker et al. | |
| 2009/0316699 A1* | 12/2009 | Mark | H04L 45/02 370/392 |
| 2010/0027552 A1 | 2/2010 | Hill | |
| 2011/0040575 A1 | 2/2011 | Wright et al. | |
| 2011/0125894 A1 | 5/2011 | Anderson et al. | |
| 2011/0126197 A1 | 5/2011 | Larsen et al. | |
| 2011/0126275 A1 | 5/2011 | Anderson et al. | |
| 2011/0231508 A1* | 9/2011 | Torii | H04L 61/103 709/208 |
| 2013/0204948 A1* | 8/2013 | Zeyliger | G06F 9/44505 709/221 |
| 2013/0326202 A1 | 12/2013 | Rosenthal et al. | |
| 2014/0189686 A1 | 7/2014 | Masters et al. | |
| 2014/0280886 A1 | 9/2014 | Burns | |
| 2014/0282413 A1 | 9/2014 | Grimme et al. | |
| 2014/0379717 A1 | 12/2014 | Urmanov et al. | |
| 2015/0039735 A1* | 2/2015 | Zeyliger | H04L 41/0816 709/221 |
| 2015/0248446 A1 | 9/2015 | Nordstrom et al. | |
| 2016/0067864 A1* | 3/2016 | Mullan | B25J 9/1605 700/19 |
| 2016/0105544 A1 | 4/2016 | Liu et al. | |
| 2016/0110657 A1* | 4/2016 | Gibiansky | G06N 20/00 706/12 |
| 2016/0283533 A1 | 9/2016 | Urmanov et al. | |
| 2016/0299961 A1 | 10/2016 | Olsen | |
| 2016/0314184 A1 | 10/2016 | Bendersky et al. | |
| 2016/0314402 A1* | 10/2016 | Buccapatnam Tirumala | G06F 9/44 |
| 2016/0359740 A1* | 12/2016 | Parandehgheibi | H04L 67/75 |

FOREIGN PATENT DOCUMENTS

| | | |
|---|---|---|
| WO | 2011/071624 A2 | 6/2011 |
| WO | 2011/102891 A1 | 8/2011 |
| WO | 2011/151500 A1 | 12/2011 |
| WO | 2013/016584 A1 | 1/2013 |
| WO | 2017/123683 A1 | 7/2017 |

OTHER PUBLICATIONS

Eyers et al., "Configuring large-scale storage using a middleware with machine learning," Wiley, 2011, 15pg. (Year: 2011).*

Chiang et al., "Matrix: Achieving Predictable Virtual Machine Performance in the Clouds," USENIX, 2014, 13pg. (Year: 2014).*

Sidhanta et al., "Infra: SLO Aware Elastic Auto Scaling in the Cloud for Cost Reduction," IEEE, 2016, 8pg. (Year: 2016).*

Davies, David L., et al., "A Cluster Separation measure", IEEE Transactions on Pattern Analysis and Machine Intelligence, vol. PAMI-1, No. 2, Apr. 1979, pp. 224-227.

Ham et al., "Interactive Visualization of Small World Graphs", INFOVIS '04 Proceedings of the IEEE Symposium on Information Visualization, 2004, pp. 199-206.

Haugen et al., "Extracting Common Time Trends from Concurrent Time Series: Maximum Autocorrelation Factors with Applications", Stanford University, Oct. 20, 2015, pp. 1-38.

Huang, Z. (1997), "A fast clustering algorithm to cluster very large categorical data sets in data mining", Proceedings of the SIGMOD Workshop on Research Issues on Data Mining and Knowledge Discovery, Dept. of Computer Science, The University of British Columbia, Canada, pp. 1-8.

Jarvis, R. A., et al., "Clustering Using a Similarity Measure Based on Shared Neighbors", IEEE Transactions on Computers, vol. C-22, No. 11, Nov. 1973, pp. 1025-1034.

Maarek Y. S., "On the Use of Cluster Analysis for Assisting Maintenance of Large Software Systems", Computer Systems and Software Engineering, 1988 Proceedings, The Third Israel Conference on Computer Systems and Software Engineering 1988, pp. 178-186.

Niino, Junichi, "Open Source Cloud Infrastructure 'OpenStack', its History and Scheme", Available online at <http://www.publickey1.jp/blog/11/openstack_1.html>, Jun. 13, 2011, 18 pages (9 pages of English Translation and 9 pages of Original Document).

Slipetskyy, Rostyslav, "Security Issues in OpenStack", Master's Thesis, Technical University of Denmark, Jun. 2011, 90 pages.

Somlo, Gabriel, et al., "Incremental Clustering for Profile Maintenance in Information Gathering Web Agents", Agents '01, Montreal, Quebec, Canada, May 28-Jun. 1, 2001, pp. 262-269.

Szmit et al., "Usage of Modified Holt-Winters Method in the Anomaly Detection of Network Traffic: Case Studies", Journal of Computer Networks and Communications, vol. 2012, Article ID 192913, Mar. 29, 2012, pp. 1-5.

Taylor J W et al: "Forecasting intraday time series with multiple seasonal cycles using parsimonious seasonal exponential smoothing", Omega, vol. 40, No. 6, Dec. 2012 (Dec. 2012), pp. 748-757.

Tibshirani, Robert, Guenther Walther, & Trevor Hastie (2001), "Estimating the number of clusters in a data set via the gap statistic", Journal of the Royal Statistical Society B, vol. 63, Part 2, pp. 411-423: 2001.

(56) References Cited

OTHER PUBLICATIONS

Voras et al., "Criteria for evaluation of Open Source Cloud Computing Solutions", Information Technology Interfaces (ITI), Proceedings of the ITI2011 33rd International Conference on Information Technology Interfaces, US, IEEE, Jun. 27-30, 2011, pp. 137-142.

Witten, Daniela M. & Robert Tibshirani (2010), "A framework for feature selection in clustering", Journal of the American Statistical Association, vol. 105, No. 490, pp. 713-726: 2010.

* cited by examiner

| CLUSTER | COUNT | DISPERSION | CENTER | |
|---|---|---|---|---|
| 2 | 1241 | 7587 | CPU_COUNT: {320.0 (55%), 480.0 (39%), ...}<br>SGA_TARGET: {336GB (86%), 8GB(6%), ...}<br>PGA_AGGREGATE_TARGET: {10GB (77%), 16GB (10%), 32GB (7%),...}<br>_COUNT: {32 (69%), 30 (11%), 33 (9%), 31 (5%), ...}<br>_COUNT: {26 (49%), 25 (38%), ...} | HIGH VARIABLE MEMORY |
| 1 | 1125 | 1395 | CPU_COUNT: {320.0 (97%), ...}<br>SGA_TARGET: {8GB (97%), ...}<br>PGA_AGGREGATE_TARGET: {4GB (97%), ...}<br>_COUNT: {30 (74%), 29 (15%), 31 (7%), ...}<br>_COUNT: {25 (73%), 26 (22%), ...} | STANDARD |
| 0 | 985 | 35 | CPU_COUNT: {480.0 (100%)}<br>SGA_TARGET: {8GB (100%)}<br>PGA_AGGREGATE_TARGET: {4GB (100%)}<br>_COUNT: {30 (90%), 31 (9%), ...}<br>_COUNT: {25 (85%), 26 (12%), ...} | STANDARD + COMPUTE |
| 3 | 233 | 562 | CPU_COUNT: {16.0 (100%)}<br>SGA_TARGET: {16GB (66%), 24GB (31%), ...}<br>PGA_AGGREGATE_TARGET: {8GB (66%), 16GB (31%), ...}<br>_COUNT: {36 (46%), 32 (31%), 35 (19%), ...}<br>_COUNT: {20 (67%), 22 (30%), ...} | SMALL & VARIABLE MEMORY |

ARTIFICIAL INTELLIGENCE DRIVEN CONFIGURATION MANAGEMENT

BENEFIT CLAIMS; RELATED APPLICATIONS; INCORPORATION BY REFERENCE

Each of the following applications are hereby incorporated by reference: application Ser. No. 16/854,635 filed on Apr. 21, 2020; application Ser. No. 16/042,971 filed on Jul. 23, 2018; application No. 62/566,235 filed on Sep. 29, 2017. The Applicant hereby rescinds any disclaimer of claim scope in the parent application(s) or the prosecution history thereof and advises the USPTO that the claims in this application may be broader than any claim in the parent application(s).

This application is related to U.S. application Ser. No. 16/041,269, filed Jul. 20, 2018, the entire contents of which are incorporated by reference.

TECHNICAL FIELD

The present disclosure relates to managing the configuration of deployed software resources.

BACKGROUND

Complex software systems are often difficult to manage due to the large number of possible combinations of configurations settings. For example, different deployments of the same software resource may have different combinations of language settings, security settings, patch set updates (PSUs) and network settings, among other configuration settings. A failure to properly manage deployment configurations may expose a system to various problems including security vulnerabilities and performance degradation.

One approach for managing software configurations is the manual creation of a gold image. According to this approach, a system administrator selects the optimal configuration settings for a group of software deployments and creates a software image (the "gold" image) that includes these configuration settings. Software deployments are then compared to the gold image to identify configuration differences. This approach is effective when a system administrator knows the optimal configurations for each software resource. However, in large and growing environments, the optimal configurations may differ between different deployments of the same software resource, and the current optimal configuration is likely not the future optimal configuration. The system administrator may have limited domain knowledge and bandwidth to determine which configuration settings are optimal and which configuration settings are problematic. As a result, this approach does not scale well to cloud-based applications and other large-scale systems.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 9 illustrates an example summary of a set of clusters, in accordance with some embodiments;

DETAILED DESCRIPTION

In the following description, for the purposes of explanation, numerous specific details are set forth in order to provide a thorough understanding. Some embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. ARTIFICIAL INTELLIGENCE DRIVEN DEPLOYMENT CLUSTERING
   3.1 FEATURE SET EXTRACTION
   3.2 CLUSTER GENERATION
   3.3 CLUSTER SUMMARIES AND REPRESENTATIVE NODES
   3.4 CLUSTERING ON DIFFERENT FEATURE SETS
   3.5 SCALABLE IN-MEMORY CLUSTER MODELS
4. INTERACTIVE INTERFACES FOR CONFIGURATION MANAGEMENT
   4.1 CLUSTER VISUALIZATIONS AND INTERFACES
   4.2 HYPOTHETICAL CLUSTERS AND REPRESENTATIVE NODE CHANGES
   4.3 SUMMARY VISUALIZATIONS AND DRILL-DOWN OPERATIONS
   4.4 DRAG-AND-DROP INTERFACE
5. CONFIGURATION MANAGEMENT OPERATIONS
   5.1 INITIALIZING NEW NODES
   5.2 UPDATING NODES AND REMEDIATING DRIFT 5.3 GOLD IMAGE SUBSCRIPTIONS
5.4 ANALYTIC OPERATIONS
5.5 TROUBLESHOOTING OPERATIONS
6. COMPUTER NETWORKS AND CLOUD NETWORKS
7. MICROSERVICE APPLICATIONS
8. HARDWARE OVERVIEW
9. MISCELLANEOUS; EXTENSIONS

1. General Overview

Techniques for artificial intelligence driven configuration management are described herein. In some embodiments, a machine-learning process determines a feature set for a plurality of deployments of a software resource. Based on varying values in the feature set, the process clusters each of the plurality of deployments into a cluster of a plurality of clusters. Each cluster of the plurality of clusters comprises one or more nodes and each node of the one or more nodes corresponds to at least a subset of values of the feature set that are detected in at least one deployment of the plurality of deployments of the software resource. The process determines a representative node for each cluster of the plurality of clusters. An operation may be performed based on the representative node for at least one cluster.

2. System Architecture

Figure 1:
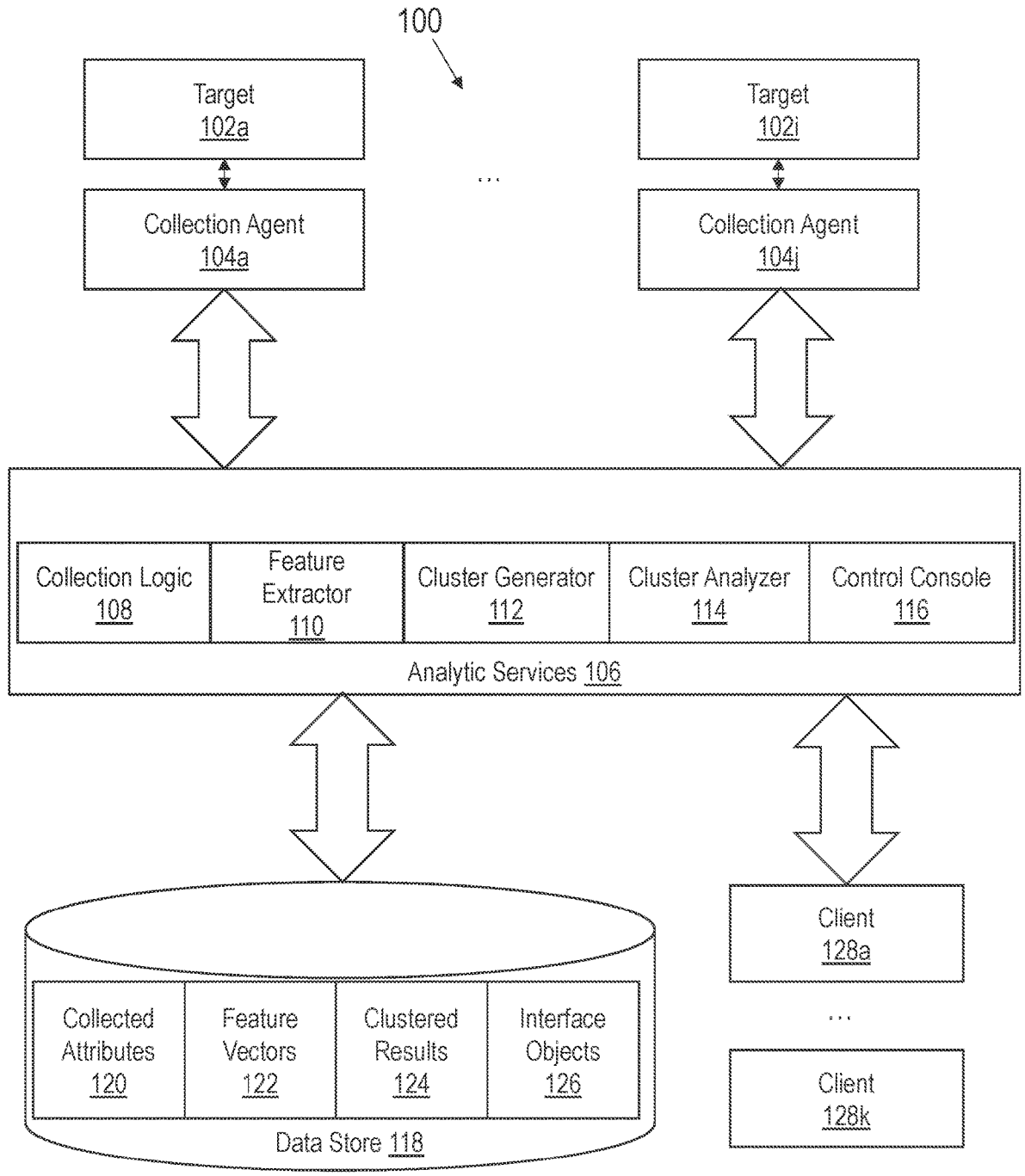
FIG. 1 illustrates an example system architecture for leveraging machine-learning to drive configuration management, in accordance with some embodiments.

FIG. 1 illustrates an example system architecture for leveraging machine-learning to drive configuration management, in accordance with some embodiments. As illustrated in FIG. 1, system 100 includes targets 102*a-i*, collection agents 104*a-j*, analytic services 106, data store 118, and clients 128*a-k*. In some embodiments, system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Targets 102*a-i* correspond to hardware and/or software components used to support deployments of a particular resource. Example hardware targets may include host machines, server appliances, network adapters, and storage drives. Example software targets may include listeners, load balancers, virtual machines, middleware, and application instances. A software resource or system in this context may be a multi-tier software application running by use of a variety of hardware and software components. For example, a multi-tier application may include a presentation tier for interfacing with one or more users, an application tier for executing application-specific logic, and a data tier for storing and retrieving data. In other cases, a software resource may be an application or other software component within a single tier of a multi-tier application. For example, the software resource may correspond to a database management system executing in the data tier of a multi-tier application. In other embodiments, a software resource may be a standalone application or other software component. For example, the software resource may be a standalone desktop application. Thus, the artificial intelligence driven management techniques described herein may be applied across a wide range of software resources.

Collection agents 104*a-j* collect deployment parameters from targets 102*a-i* and provide the deployment parameters to analytic services 106 for subsequent processing. One or more of collection agents 104*a-j* may be a daemon or background process that executes on the same host as a target. Additionally or alternatively, one or more of collection agents 104*a-j* may be located on a remote host from a target for which the agent is configured to collect parameters. Although one collection agent is depicted per target, a collection agent may collect parameters from multiple targets or from a single target, depending on the implementation.

The deployment parameters that are collected may vary from implementation to implementation. Example parameters include one or more of the following:

Configuration settings: These parameters identify configurations of a deployment of a software resource. For example, these parameters may identify what patches have been applied to the deployment, security settings such as firewall and open network port configurations, language settings such as what language has been selected on startup, operating system (OS) settings such as OS name and version on a host machine on which the software resource is configured to execute, and log settings such as the maximum log size and rate.

Static attributes: These parameters identify characteristics of a deployment that do not change during runtime. For example, a static attribute may encode information about the software binary or code footprint for a deployment.

Runtime attributes: These parameters identify characteristics of the deployment that are captured during runtime. For example, the parameters may capture runtime performance attributes such as average/min/max CPU performance, memory bandwidth, active sessions, and I/O throughput. The parameters may further capture bug reports, security vulnerabilities, log writing throughput, and other information that is not statically available.

System architecture: These parameters identify the structure and relationships of components used to run a software resource. For example, an attribute may identify information about the target host (or hosts) on which the software resource is run, such as the geographic location, hostname, and IP address. In another example, these parameters may capture topology/architecture information such as dependencies between different targets supporting a deployment of the software resource. In yet another example, these parameters may identify a list of available services that are supported by the deployment of the software resource.

Analytic services 106 include a set of applications and/or web services that may be invoked to perform clustering and management operations as described further herein. Analytic services 106 comprises collection logic 108, feature extractor 110, cluster generator 112, cluster analyzer 114, and control console 116. Each service implements a function or set of functions as follows:

Collection logic 108 interfaces with collection agents 104*a-j* to collect deployment parameters for a plurality of deployments of a software resource;

Feature extractor 110 extract features from the deployment parameters that are used to cluster the deployments of the software resource;

Cluster generator 112 clusters the deployment parameters based on values of the feature set detected in the plurality of deployments of the software resource;

Cluster analyzer 114 summarizes/annotates clusters based on members of the cluster; and Control console 116 provides an interface through which one or more functions of analytic services 106 may be invoked.

The set of functions summarized above may be implemented by a single service or through different services. Additionally or alternatively, functions shown as performed by a single service may be executed by different services, depending on the particular implementation. One or more of the services may be encapsulated into a microservice application and/or a cloud application, such as a software-as-a-services (SaaS) application.

In an embodiment, analytic services 106 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Data repository 118 includes volatile and/or non-volatile storage for storing data that is generated and/or used by analytic services 106. The datasets that are stored include:

Collected attributes 120, which comprises deployment parameters collected by collection logic 108;

Feature vectors 122, which comprises feature vectors that encoded different instances of a feature set detected by feature extractor 110;

Clustered results 124, which groups deployments/instances of a feature set into clusters; and Interface object 126, which comprises charts, graphs, annotations, summaries, and/or other elements to present to a user.

In some embodiments, data repository 118 is any type of storage unit and/or device (e.g., a file system, database, collection of tables, or any other storage mechanism) for storing data. Further, data repository 118 may include multiple different storage units and/or devices. The multiple different storage units and/or devices may or may not be of the same type or located at the same physical site. Further, data repository 118 may be implemented or may execute on the same computing system as one or more other components of system 100 and/or on a completely separate computing system. Data repository 118 may be communicatively coupled to analytic services 106 via a direct connection or via a network.

Clients 128*a-k* represent one or more clients that may access analytic services 106 to perform clustering and management operations as described further herein. A "client" in this context may be a human user, such as an administrator, a client program, or some other application instance. A client may execute locally on the same host as analytic services 106 or may execute on a different machine. If executing on a different machine, the client may communicate with analytic services 106 via one or more data communication protocols according to a client-server model, such as by submitting HTTP requests to invoke one or more of the services and receiving HTTP responses comprising results generated by one or more of the invoked services.

Control console 116 may provide clients 128*a-k* with an interface through which one or more of the provided services may be invoked. Examples of interfaces include a graphical user interface (GUI), a command line interface (CLI), an application programming interface (API), a haptic interface, and a voice command interface. Examples of user interface elements include checkboxes, radio buttons, dropdown lists, list boxes, buttons, toggles, text fields, date and time selectors, command lines, sliders, pages, and forms.

Additional embodiments relating to computer networks and microservice applications are described below in Section 6, titled "Computer Networks and Cloud Networks", and Section 7, titled "Microservice Applications", respectively.

3. Artificial Intelligence Driven Deployment Clustering

In some embodiments, analytic services 106 are configured to perform unsupervised cluster analysis of deployment parameters collected from a plurality of deployments of a software resource. Clusters may be formed based on learned patterns in the deployment parameters among different configurations of a software resource. These patterns may be hidden or not otherwise readily apparent, allowing inferences to be drawn that might be prohibitively expensive to determine from the raw deployment data.

Figure 2:
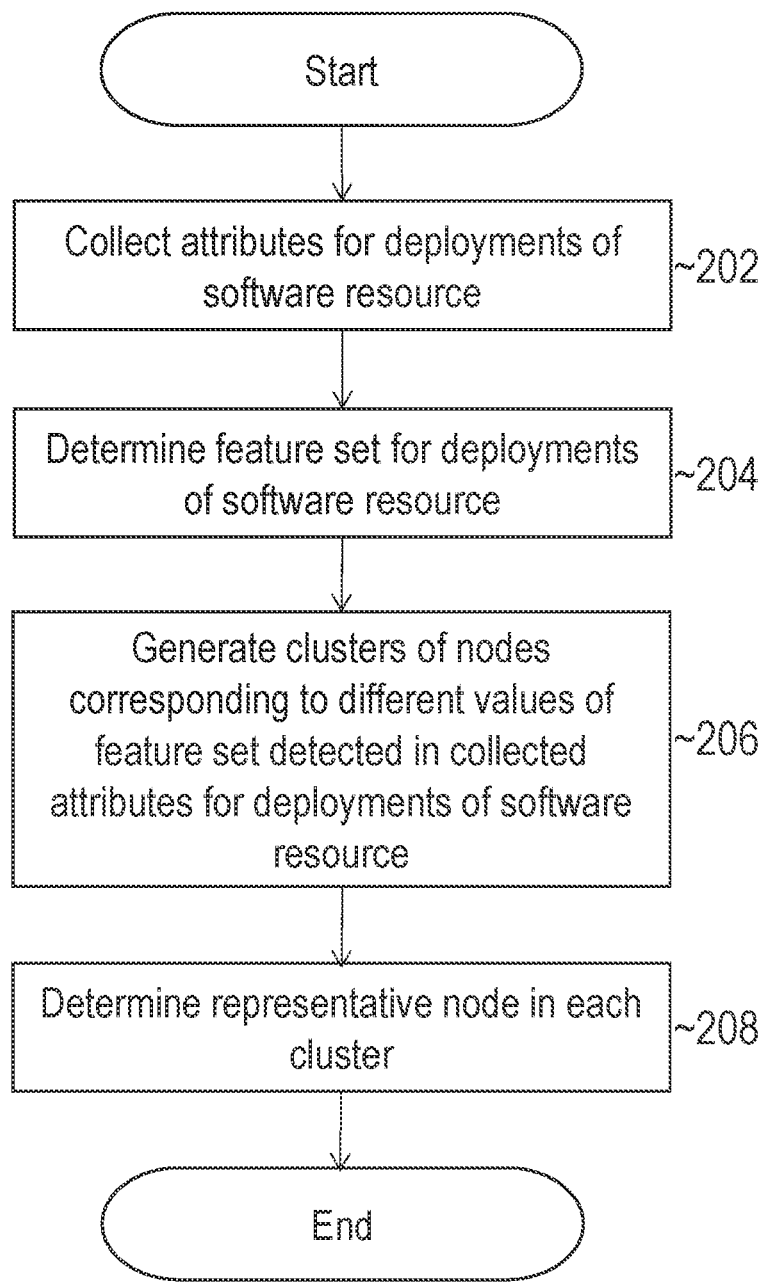
FIG. 2 illustrates an example set of operations for managing deployments of a software resource, in accordance with some embodiments.

FIG. 2 illustrates an example set of operations for managing deployments of a software resource, in accordance with some embodiments. Additional examples and embodiments for each of these operations are provided in further detail in subsections 3.1 to 3.4 below. The set of operations comprises collecting parameters for a plurality of deployments of a software resource (Operation 202). For example, collection logic 108 may collect configuration settings, static attributes, runtime attributes, and/or system architecture data from deployments of a particular software application or system.

The set of operations further comprises determining a feature set for deployments of the software resource (Operation 204). The feature set used to cluster deployments may vary from implementation to implementation. In some embodiments, a combination of collected deployment parameters is used. For example, the feature set may include one or more of the parameter collected at Operation 202, such as one or more configuration settings, static attributes, runtime attributes and/or system architecture attributes. Different feature sets may be used to generate different clusters as described in further detail in subsection 3.4. In other embodiments, clustering may be performed on a single feature set.

The manner in which parameters are selected for a feature set may vary depending on the particular implementation. Parameters may be selected in an unsupervised or supervised manner. For example, the parameters may be selected algorithmically, such as through a machine-learning model that uses supervised or unsupervised processes to train correlation models. An example correlation-based machine learning model is described in U.S. application Ser. No. 15/155,486, titled "CORRELATION-BASED ANALYTIC FOR TIME-SERIES DATA", the entire contents of which are hereby incorporated by reference as if set forth in their entirety. As another example, parameters may be selected automatically based on a set of filter criteria, which may be predefined by default or selected by a user. Parameters that satisfy the filter criteria a retained in the feature set whereas parameters that do not satisfy the filter criteria are removed. In yet another example, parameters may be curated by an external user/client. The curated set of parameters may be stored in a list or similar data structure and matched to the collected parameters.

Referring again to FIG. 2, the set of operations further comprises generating clusters of nodes based on varying values of the feature set detected in the collected deployment parameters (Operation 206). The values in the feature set may be determined from the collected deployment parameters. Generally, deployments are clustered based on the similarity of values, such as configuration settings, runtime metrics, etc., of the feature set. That is, a deployment is more likely to be assigned to the same cluster as another deployment that has similar values for the feature set than another deployment that has dissimilar values for the feature set.

The set of operations further comprises determining a representative node in each cluster (Operation 208). The representative node for a cluster may be selected from an existing node or may be constructed as a new node for the cluster. In some embodiments, the representative node corresponds to the mode of the cluster. The mode in this context is the node having the most frequently occurring combination of values in the feature set among deployments assigned to the cluster.

Determining the mode may involve further excluding certain features from the feature set that are either not relevant to the intended purpose of the representative node. As an example, a feature may be excluded if it does not impact and/or is not impacted by upgrade or patching operations, which could be determined by looking at the features that are the subject of upgrade or patching operations. As another example, a feature may be excluded if the feature is not relevant to the functionality being analyzed, which may be determined based on whether the value is present in some systems having the functionality and absent in other systems lacking the functionality. The result is to determine the mode for the relevant subset of features.

In other embodiments, the representative node may be constructed or selected in some other way, such as by computing the mean of the values in the feature set or selecting a last-known configuration for the cluster, such as a latest version or date of an upgrade or patch that is present in the cluster. For example, a feature value for the representative node may be computed as the average value across deployments, which may or may not have been detected in one of the deployments assigned to the cluster.

Figure 3:
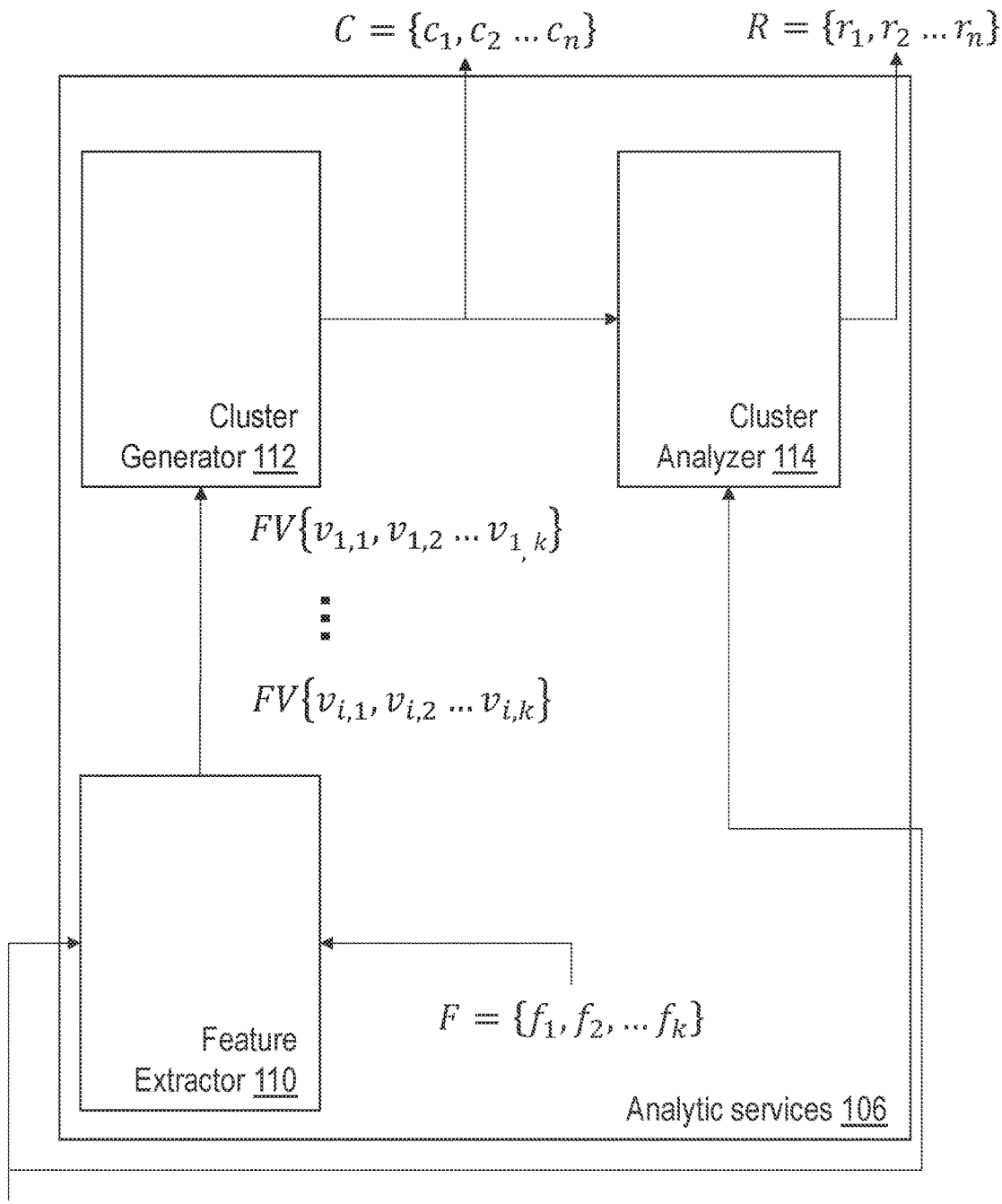
FIG. 3 illustrates an example dataflow diagram for generating a set of annotated clusters, in accordance with some embodiments.

FIG. 3 illustrates an example dataflow diagram for generating a set of annotated clusters, in accordance with some embodiments. Feature extractor 110 receives a set of deployment parameters, denoted D, for multiple deployments of a software resource. The set of data points $\{x_{1,1}, \ldots, x_{i,j}\}$ may comprise parameter values for different deployment parameters. For example, a value may identify a configuration setting, runtime metric, topology information, etc., for a corresponding deployment. Feature extractor 110 also receives a feature set denoted F, identifying the features that should be used for clustering. Based on the feature set F and the deployment parameters, feature extractor 110 creates a feature vector, denoted FV, for each software deployment. Cluster generator 112 receives the feature vectors and generates a set of clusters denoted C. Each cluster in C comprises one or more nodes that correspond to at least a subset of values in the feature set F. Cluster analyzer 114 determines a representative node for each cluster, which is identified in dataset R.

3.1 Feature Set Extraction

A feature set refers to a set of attributes or parameters which drive the clustering process. The feature set may include any combination of parameters collected from the software deployments. Additionally or alternatively, the feature set may include attributes that are calculated (herein referred to as a "calculated feature") from the collected deployment parameters. For example, a feature set for clustering database instances may include the following three raw features:

a CPU count identifying the number of CPUs available for a database instance to use;

the memory allocated to the database instance; and the memory throughput for the database instance.

The feature set may further include the following two calculated features:

a parameter referred to herein as "count", which is assigned a value identifying the number of configuration settings changed from a default setting; and a parameter referred to herein as "_count", which is assigned a value identifying the number of undocumented configuration settings utilized.

The above feature set is useful for clustering database instances as a function of performance metrics and configuration settings. However, the combination of features and number of features used may vary, depending on the particular implementation.

In some cases, a feature set may include all the collected deployment parameters in addition to calculated features, if any. However, many of the parameters may not be helpful for clustering. For example, clustering based on a version number may not convey useful information if all the deployments are running on the same version of a software resource or the administrator is not interested in using the version number as a distinguishing feature. For other applications, however, clustering based on version number, among other features, may be useful, such as to compare performance metrics across different versions of a software resource. Feature extractor 110 may extract the features that are used for clustering and filter/remove the parameters that are not used. Feature extractor 110 may perform the extraction based on injected domain knowledge, such as a set of curated parameters, based on a set of filtering criteria and/or algorithmically, as previously mentioned.

Figure 4:
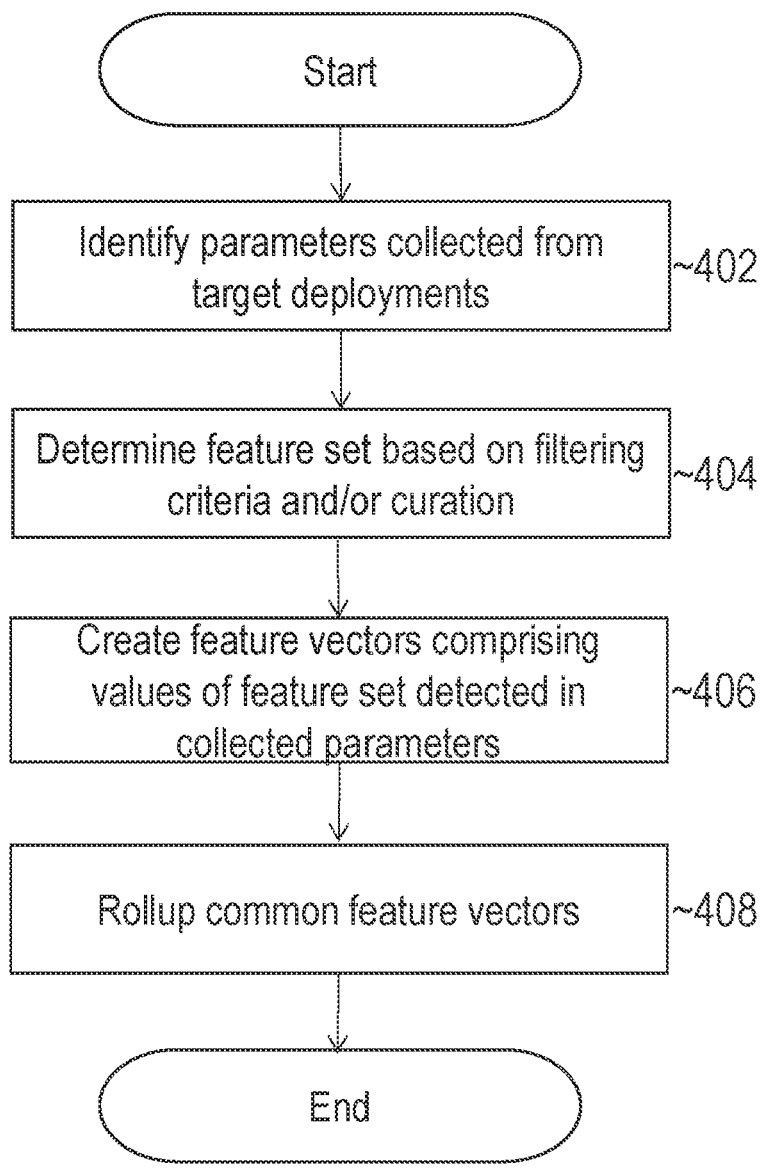
FIG. 4 illustrate an example set of operations for extracting a feature set for clustering deployments of a software resource, in accordance with some embodiments.

FIG. 4 illustrate an example set of operations for extracting a feature set for clustering deployments of a software resource, in accordance with some embodiments. The set of operations includes identifying a set of parameters collected from the target software deployments (Operation 402).

The set of operations further includes determining a feature set based on filtering criteria and/or curation (Operation 404). Example filtering criteria may include the cardinality of the parameter. For example, parameters that are common across all instances or have a cardinality that exceeds a threshold may be removed. In the latter case, for instance, features may be removed if the features are common across more than one hundred deployed resources, more than 80% of deployed resources, or any other threshold value. This filter removes parameters for which there is little to no variation between different software deployments.

Additionally or alternatively, other filtering criteria may be used to remove parameters from the feature set. For example, feature extractor 110 may detect and stem predefined parameters such as the version number and/or other parameters that are not relevant.

In some embodiments, a parameter may be analyzed to determine whether it satisfies a filter. For example, parameters may be compared to a set of patch information to determine whether the parameter is the subject of an upgrade or patching operation. If not, the parameter may be filtered out from the feature set.

Additionally or alternatively, parameters may be selected based on curation. For example, a system administrator or other user may provide a list of parameters that are of interest. Only the features that are on the list of parameters are then included in the feature set. As another example a system administrator or other user may provide a list of parameters that should be excluded. Features that are on the list are excluded from the feature set while features not in the list of parameters may or may not be included in the feature set. Feature curation allows domain knowledge to be injected into the process to tailor the feature extraction process.

Additionally or alternatively, a feature within a feature set may be a calculated feature that is computed based on one or more collected parameters. For example, a feature may be created by counting the number of non-default parameter setting, such as configuration values that have been changed by a user from the default state. A higher value may reflect a greater number of changes from the default state. As another example, a feature may be created by counting the number of undocumented parameters set. The value may be incremented for each custom patch or other add-on applied to the software deployment. In yet another example, performance metrics may be aggregated or otherwise combined.

The set of operations further includes creating feature vectors comprising values of feature set detected in the collected parameters (Operation 406). A unique combination of values for the feature set is referred to herein as an "instance" of the feature set. In the example where the feature set is {CPU count, memory allocated, memory throughput, count, _count}, an example feature vector for an instance of the feature set may be {320, 8 GB, 97%, 30, 25}. However, the values may vary between different deployments and feature vectors.

The set of operations further includes rolling up common feature vectors (Operation 408). For example, if two or more deployments share the same values for a feature set or a relevant subset of the feature set, then these feature vectors may be rolled up into one. A count value may be maintained that identifies how many deployments share the feature values encoded by the feature vector. Additionally or alternatively, a mapping may be maintained between the feature vector and the deployments represented by the feature vector.

3.2 Cluster Generation

Figure 5:
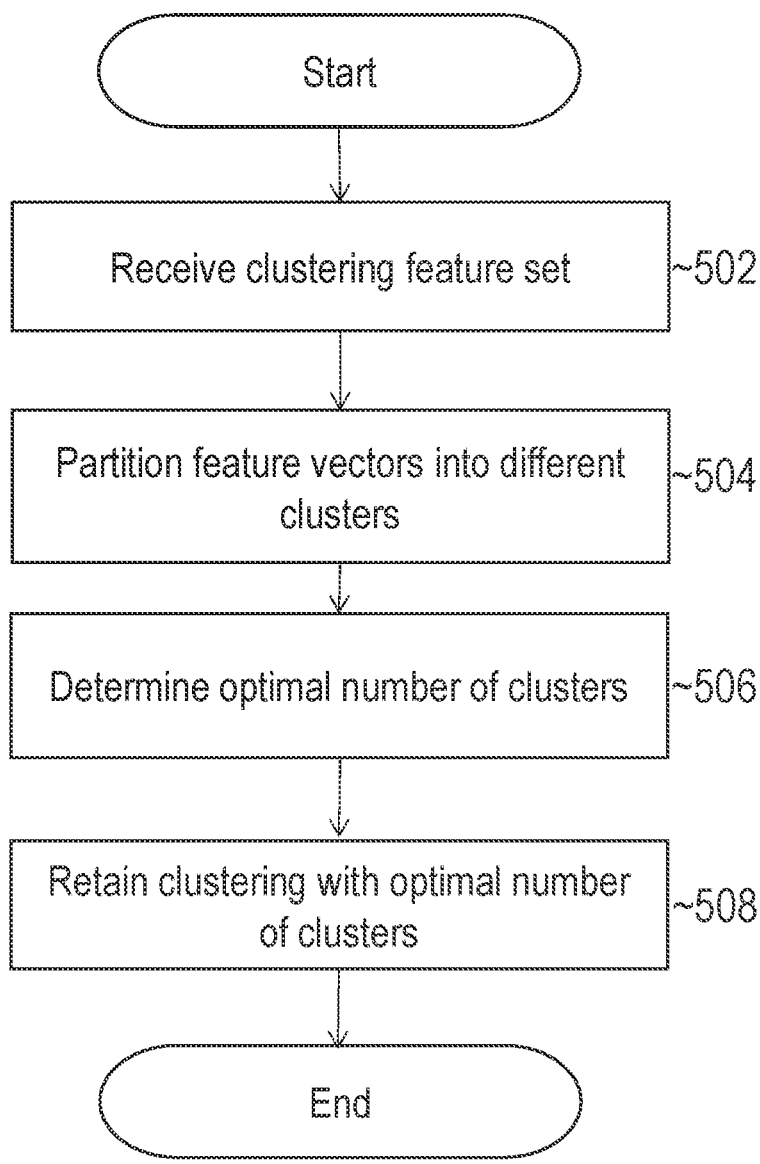
FIG. 5 illustrates an example set of operations for clustering a set of deployments of a software resource, in accordance with some embodiments.

Once the clustering features have been extracted, cluster generator 112 runs a cluster analysis that produces clusters of target resources, such as software deployments. FIG. 5 illustrates an example set of operations for clustering a set of deployments of a software resource, in accordance with some embodiments. The set of operations includes receiving the cluster feature set (Operation 502). The feature set may be extracted as described in the previous subsection and provided to cluster generator 112.

The set of operations further comprises partitioning the feature vectors into a plurality of clusters (Operation 504). The clustering method that is used may vary from implementation to implementation. Examples may include, but are not limited to, k-mode clustering and k-means clustering.

With k-mode clustering, for instance, the clustering process may randomly select k unique feature vectors as initial cluster centers. The cluster process may then calculate the distance between each feature vector and the cluster mode and assign the feature vector to the cluster whose center has the shortest distance to the feature vector. A new mode may then be selected for each cluster and compared with the previous mode. If it is different, then objects may be reassigned. Otherwise, clustering may stop.

The set of operations further comprises determining an optimal number of clusters for the software deployments (Operation 506). In some embodiments, the optimal number of clusters is determined by performing operation 504 for multiple values of k, where k is the total number of clusters. For example, the feature vectors may be partitioned into two clusters, three clusters, etc. up to a maximum threshold. A gap statistic may then be used to select the optimal k. According to this technique, one or more random datasets are clustered and compared to the results of clustering the actual dataset. The number of clusters k is then selected to maximize the gap statistic, which is defined as:

$$Gap_n(k) = E_n^* \{\log(W_k)\} - \log(W_k)$$

where $E_n^*$ denotes expectation under a sample size of n from the random distribution and $W_k$ is the pooled within-cluster sum of squares around the cluster mode or means.

The set of operations further comprises retaining the clustering that has the optimal number of clusters (Operation 508). For example, if the optimal number for k is three, then three clusters are retained as generated through k-mode or k-means clustering.

As previously indicated, feature vectors may be assigned to clusters based on distance. The distance function that is used may vary from implementation to implementation. In some embodiments, a Euclidean distance is used to assign feature vectors to clusters. In other cases, features may be associated with weights. For example, features that account for more significant differences may be weighted more heavily for the distance calculation than features that are of lesser significance. In other cases, all features in a feature set may be weighted evenly.

The result of the clustering operation is a set of clusters that comprise one or more nodes. Each node in a cluster corresponds to a feature vector that stores values of the feature set that were detected in one or more software deployments. For example, the feature vector {320, 8 GB, 97%, 30, 25} may be an instance of the feature set {CPU count, memory allocated, memory throughput, count, _count}. This feature vector (which is an instance of the aforementioned feature set) may have been detected in a single deployment or in multiple deployments. In the latter case, assigning the feature vector to a cluster effectively assigns multiple deployments having the corresponding feature values to the cluster.

3.3 Cluster Summaries and Representative Nodes

In some embodiments, cluster analyzer 114 is configured to generate a summary for each cluster. A summary may comprise information about hidden patterns or other information about the cluster that may be useful for configuration management. For example, a summary may identify the number of distinct configurations of software deployments that have been assigned to the cluster, the magnitude of dispersion/differences between the clusters, and/or common configuration settings in the cluster.

Additionally or alternatively, a summary may identify a representative node for the cluster. In the context of configuration settings, the representative node may be selected as the set of most frequently detected configuration values for deployments assigned to the cluster. The representative node may be selected as a gold/recommended level of configuration for other nodes assigned to the cluster. In other contexts, the representative node may identify the most common security vulnerabilities, bugs, performance metrics or other deployment parameters detected among the software deployments. The representative node may allow a user to quickly understand and visualize configuration drift and/or other potential issues among a large number of deployments of a software resource.

Figure 6:
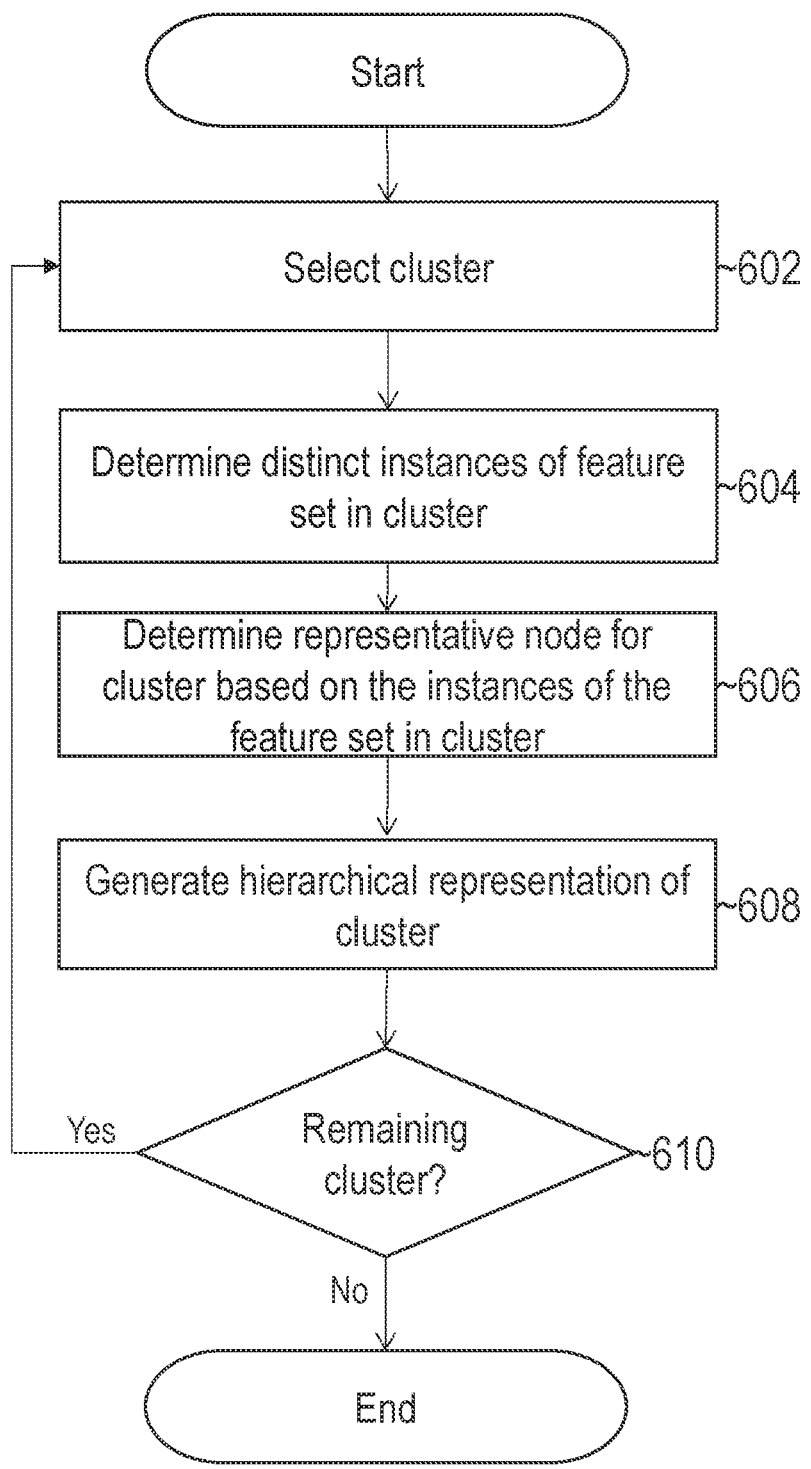
FIG. 6 illustrates an example set of operations for summarizing a set of clusters, in accordance with some embodiments.

FIG. 6 illustrates an example set of operations for summarizing a set of clusters, in accordance with some embodiments. The set of operations includes selecting a cluster (Operation 602). The clusters may be analyzed in any order. For example, cluster analyzer 114 may select the first cluster $c_1$ from dataset C or start with any other cluster in the dataset.

The set of operation further comprises determining distinct instances/feature vectors of the feature set within the cluster (Operation 604). In the context where the feature set comprises a combination of configuration settings, for instance, this operation may involve determining how many unique combinations of values for the configuration settings are in the cluster. This number corresponds to the number of unique configurations of the feature set for software deployments in the cluster.

The set of operations further comprises determining a representative node for the cluster based on the instances of the feature set in the cluster (Operation 606). As previously noted, the representative node may be selected as the node in the cluster corresponding to the largest number of software deployments. In other embodiments, the node may be constructed as a new node rather than being selected from an existing node. For example, a new node may be constructed by averaging the values in the feature set across multiple nodes in the cluster.

The set of operations further comprises generating a hierarchical representation of the cluster (Operation 608). In some embodiments, the hierarchical representation is a graph that is computed based on diffs of each non-representative node in the cluster. The graph may be recursively built to describe the structure of how the configurations differ from the representative node. The hierarchical graph may identify complete paths to each distinct configuration/state of software deployments in the cluster. The hierarchical graph may also identify any common intermediate observed configurations/states. The graph may provide a convenient interface for up-levelling. By having intermediate states, the graph may be recursively collapsed or expanded based on user interests and preferences.

Once the summary has been generated, the process determines whether there are any remaining clusters to analyze (Operation 610). If so, then the process repeats for the next selected cluster. If there are no remaining clusters to summarize, then the process ends.

3.4 Clustering on Different Feature Sets

In some cases, software deployments may be clustered multiple times using different clustering features sets. For example, set of clusters may be generated based on a feature set comprising various security parameters. Another set of clusters may be generated using a feature set comprised of performance features. Yet another may focus on patch set updates. Thus, different sets of clusters may be aligned with different interests.

In some embodiments, feature sets may be grouped into categories, which may include user-defined and/or system defined categories. Different categories may be associated with different feature sets. For example, a performance category may be defined to cluster target resources using a set of performance attributes, which may be defined by system 100 or a user. For instance, the performance attributes may include CPU utilization, network throughput, and/or memory utilization. Additionally or alternatively, a security category may be defined to include a combination of security parameters such as patch levels, open ports, and firewall settings. Additionally or alternatively, categories may be defined to analyze various tiers of a multi-tier application. For instance, a presentation tier category may be defined to include a combination of attributes associated with the presentation tier of a target deployment, such as web server host configuration settings and web server performance information. Similar categories may be defined for the application tier, data tier, and/or for any other set of deployment parameters.

When multiple categories are defined, a user may select the categories for which to perform clustering. For example, if the user selects the performance category, then a set of feature vectors may be created using a combination of performance attributes defined for the category. Clustering may then be run to group similar performing software deployments. The user may then select another category, such as security, to create feature vectors using a combination of security attributes. Clustering may then be run using the newly created feature vectors to group software deployments with similar security settings. Additionally or alternatively, clustering may be run based on feature vectors created from other combinations of attributes. Clustering using different feature vectors may be performed sequentially or in parallel.

In the examples given above, a software deployment may be assigned to different cluster sets across different categories. For example, when clustering on performance attributes, a software deployment may be assigned to one cluster set that includes one or more other software deployments. When clustering on a different set of attributes, the software deployment may be assigned to another cluster set that include a different group of software deployments.

In some embodiments, a software deployment may be linked across different cluster sets. For example, a hyperlink and/or reference may be maintained that allows the user to navigate between different cluster sets to which a software deployment was assigned. The user may select the link associated with a software deployment to jump to and/or view the other cluster set. For instance, the user may be presented with a cluster set that was generated as a function of performance attributes and a cluster set that was generated as a function of security attributes. The user may click on or otherwise select a link representing a software deployment in the performance cluster set to view where the software deployment is assigned in the security cluster set. The cluster set of interest may be annotated, enlarged or otherwise highlighted to facilitate identification. Thus, the user may easily determine and visualize how a particular software deployment aligns with other deployments along several feature set dimensions.

3.5 Scalable In-Memory Cluster Models

One approach for modelling the clusters in memory is to create data points representative of individual target resources and to run the clustering process on these data points. A data point for given target resource may store or link to the configuration settings for the target resource. A feature vector may be created from the configuration settings for the target resource and compared to the cluster centroids to compute distances and select a cluster for the data point. As each data point is independently assigned to a cluster, this approach may involve maintaining a list of configuration settings for each target resource subject to clustering, which may be difficult to scale. Large datacenters and cloud environments may have thousands or more target resources. As a result, the amount of memory overhead to maintain a full list of configuration settings may be significant.

An alternative approach that reduces the memory footprint is to replace lists of entity configurations with the distinct configurations. In this approach, redundant configurations are discarded and only the distinct configurations are retained in memory. The distinct configurations may then be mapped to a list of entities that have those distinct configurations. As a result, the number of entity configurations may be significantly compressed, which may significantly reduce the memory footprint of the cluster models.

The memory savings of replacing the lists of entity configurations with distinct configurations is illustrated in the example below. The following raw samples may be provided as input for the clustering model:

Entity 1: "param_a":1, "param_b":2, "param_c":3, "param_d":4
Entity 2: "param_a":1, "param_b":20, "param_c":30, "param_d":4
Entity 3: "param_a":1, "param_b":2, "param_c":3, "param_d":4
Entity 4: "param_a":10, "param_b":2, "param_c":3, "param_d":42
Entity 5: "param_a":1, "param_b":20, "param_c":30, "param_d":4

From the above raw input, three three distinct configuration settings are detected, which may be represented as follows:

State 1: "param_a":1, "param_b":2, "param_c":3, "param_d":4, "entities":[1,3]
State 2: "param_a":1, "param_b":20, "param_c":30, "param_d":4, "entities":[2,5]
State 3: "param_a":10, "param_b":2, "param_c":3, "param_d":42, "entities":[4]

Each distinct configuration is mapped to one or more target resources that share the specified configuration settings. As can be seen, the list of five configuration settings in the raw data is reduced to three distinct configuration settings. The cost savings may be much greater when there are hundreds or more inputs.

Scalability may also be improved by enumerating the states across the parameter that are used for clustering, which correspond to the parameters selected as part of a feature set. For example, clustering may be performed on the parameters "param_a" and "param_d" from the collected configuration settings listed above. The space may thus be collapsed to the following two feature vector instances:

Vector 1: "param_a":1, "param_d":4
Vector 2: "param_a":10, "param_d": 42

The distinct feature vector instances may then be clustered as previously described. The states and respective entities may then be assigned to the corresponding feature vector once clustering is complete. For example, State 1 and State 2, and the corresponding entities [1, 2, 3, 5] are assigned to Vector 1. State 3 and the corresponding entity [4] is assigned to Vector 2. Diffs may be computed based on param_b and param_c for entities associated with the same feature vector.

4. Interactive Interfaces for Configuration Management

One or more interactive interfaces may be generated based on the set of summarized clusters. The interactive interfaces may allow a user to visualize, navigate, and otherwise access summary information about a cluster. Additionally or alternatively, the interactive interface may provide a user with options for performing one or more management operations based on the cluster results/summary. Example that may be launched through the interactive interfaces provided herein are described in Section 5, titled "Configuration Management".

Subsections 4.1 to 4.4 provide examples of interactive interfaces and visualizations that may be generated from a clustered set of results. The interactive interfaces and visualizations may facilitate configuration management in various ways. For example, the interactive interfaces may allow configuration drift between similar target resources to be quickly identified through intuitive visualizations and efficiently remediated. As another example, the interactive interfaces may allow security vulnerabilities and performance degradation to be quickly identified and resolved. The example interfaces and visualizations depicted below are provided for purposes of illustration only. The presentation and format of the interactive interfaces and visualizations may vary from implementation to implementation.

4.1 Cluster Visualizations and Interfaces

Figure 7:
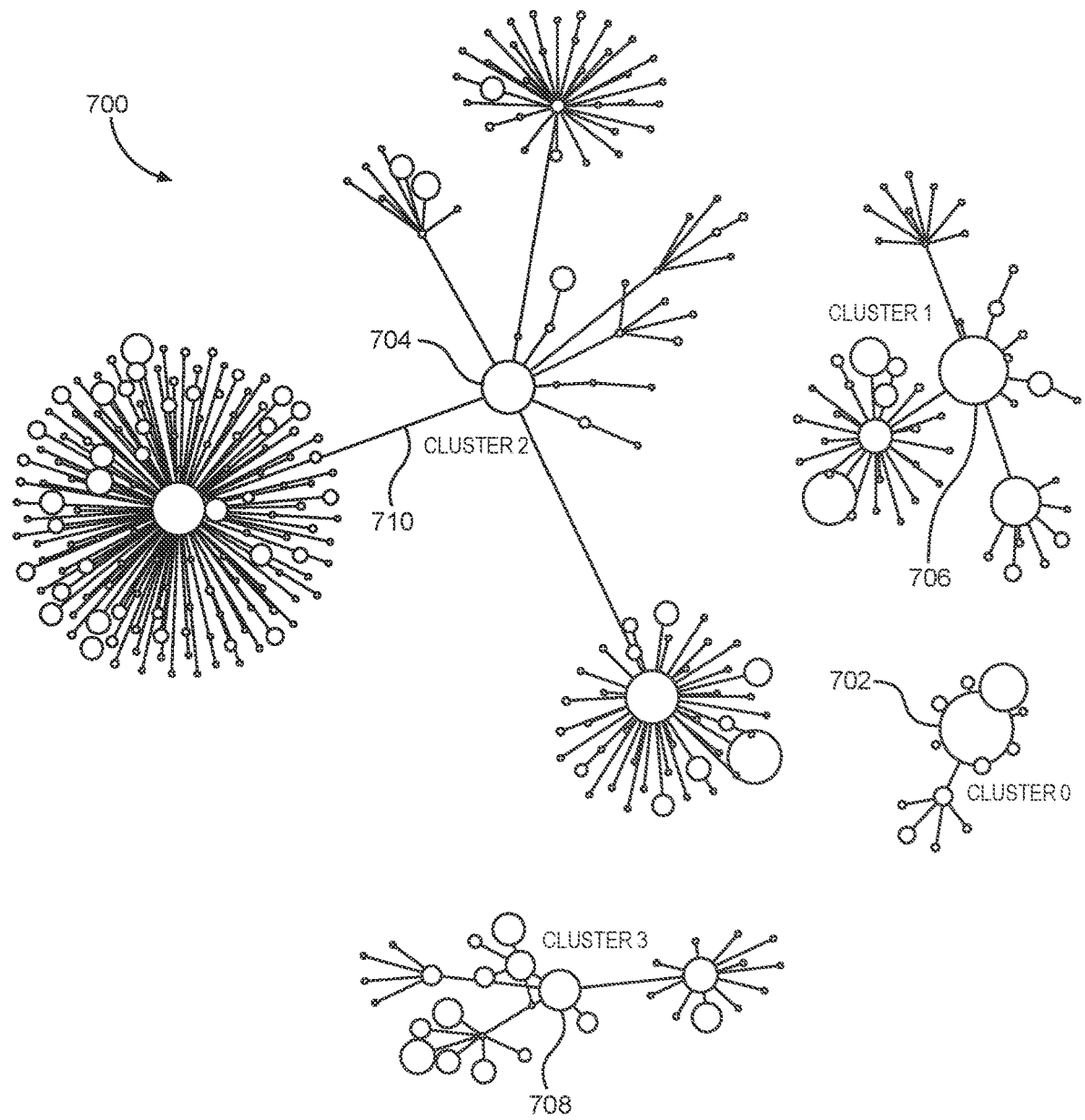
FIG. 7 illustrates an example interactive visualization of a set of clusters, in accordance with some embodiments.

In some embodiments, cluster visualizations include graphical representations of a set of nodes and edges. The graphical representation may be generated based on the hierarchical graph generated for the clustered results. A node in a cluster visualization may represent one or more target resources and a unique instance of a feature vector. Edges connect different nodes that have been assigned to the same cluster. For example, FIG. 7 illustrates example interactive visualization 700 of a set of clusters. Interactive visualization 700 displays cluster 0, cluster 1, cluster 2, and cluster 3. Each cluster includes a plurality of nodes or vertices corresponding to different instances of the clustering feature set.

In some embodiments, a representative node is selected for a cluster. For example, the representative node may be selected as the most frequently occurring instance of a feature vector or may be constructed as previously described. The representative node may correspond to a gold image or recommended configuration for deployments assigned to the cluster. Referring to FIG. 7, for instance, the gold image representation for clusters 0-3 are nodes 702, 704, 706, and 708, respectively. The representative node may be visually highlighted to facilitate identification. For example, the representative node may be displayed in a separate color from other nodes in the cluster. Additionally or alternatively, the representative node may be displayed with a larger size and/or annotated.

In some embodiments, the size of a node/vertex in the graph is displayed as a function of the number of software deployments having the configuration settings and/or other values of the feature set corresponding to the node. For example, the size of the node may be proportional to the log of the number of software deployments. Thus, nodes corresponding to a greater number of software deployments may have a larger display size/area than those corresponding to fewer deployments. The representative node may have the greatest display size of the nodes in the cluster.

In some embodiments, nodes that belong to the same clusters are connected by edges, which may be graphically represented as a line. For example, the representative nodes for each cluster (nodes 702, 704, 706, and 708) are each connected to a plurality of other nodes representing different instances of a feature vector. These nodes may also be connected by edges to other nodes, supporting hypothetical clusters as described further in subsection 4.2.

The edge length between nodes in FIG. 7 may be arbitrarily selected to fit the display based on the display resolution. In other embodiments, the edge length may encode the distance between the vectors that represent the two nodes. For example, the edge size may increase proportionally with the Euclidean distance of two nodes. Thus, nodes that are relatively similar are displayed closer together than nodes that are relatively different with respect to other nodes in the cluster.

In some embodiments, the nodes of a cluster are interactive, allowing a user to quickly access information about a set of deployments and initiate management operations. For example, a user may click on or otherwise select a node, such as node 704, to view information about deployments associated with the node. Example information that may be presented may include the configuration settings or other feature values represented by the node, the number of deployments assigned to the node, the geographic location or locations of the deployments within the node, and/or attributes that are common to the deployments associated with the node. As another example, a user may be presented with a list of target deployments and collected configuration settings for each target deployment upon selecting a node. In yet another example, a user may be provided with a set of available management operations upon selecting a node. The user may then select a management operation to perform with respect to the selected node. Example management operations are described further below in Section 5, titled "Configuration Management".

Additionally or alternatively, the edge between two nodes in the graph may be interactive. For example, a user may select an edge to identify differences between different portions of a cluster. Referring to FIG. 7, for instance, selecting edge 710 may cause a comparison between different parameter values to be displayed. As can be seen, the different sub-clusters have different CPU counts, log buffer rates, and CPU allocation. Selecting an edge may allow a user to perform one or more operations with respect to the nodes and/or sub-clusters connected by the edge. For example, differences between two nodes may be reconciled through an update operation in some cases.

Additionally or alternatively, clusters and/or groups of nodes may be interactive. For example, a user may select one of clusters 0-3 to drill-down and view more information about the cluster or to perform management operations with respect to the cluster. As another example, a user may select a subset of nodes in a cluster to view node relationships and execute management operations against the nodes. The interface may thus allow a user to perform operations at various levels of granularity. Executing management operations against large groups of nodes provides for efficient bulk operations. At the individual node level, more tailored operations may be executed.

4.2 Hypothetical Clusters and Representative Node Changes

In some embodiments, cluster interfaces may facilitate the identification and performance of operations on hypothetical clusters. A hypothetical cluster in this context refers to a sub-cluster within a cluster that shares common parameters, such as configuration settings. The parameters that are common to a hypothetical cluster may differ from parameters of other nodes in the same cluster, such as nodes belonging to other sub-clusters.

In some embodiments, a hypothetical cluster may be sub-cluster that is connected to the representative node for a cluster. For example, edge 710 connects the representative node 706 with a corresponding sub-cluster. While representative node 706 has been selected as the gold standard, the sub-cluster supports a hypothesis for an additional cluster. In the example illustrated, the nodes of the sub-cluster share a common CPU count, log buffer rate, and CPU allocation. These parameters, common to the sub-cluster, are different from the representative node for the cluster and nodes in other sub-clusters. Other hypothetical clusters are also connected to nodes 704 in addition to the sub-cluster connected by edge 710.

In some embodiments, each hypothetical cluster includes a node that is representative of a sub-cluster, which is referred to herein as a hypothetical representative node. The hypothetical representative node is directly connected to the representative node for the entire cluster. For example, edge 710 connects the hypothetical representative node for one hypothetical cluster. The hypothetical representative node may be selected as the most commonly occurring instance of a feature vector within the sub-cluster. Additional nodes in the sub-cluster may be connected directly to the hypothetical representative node rather than the representative node for the cluster.

In some embodiments, a hypothetical cluster may run multiple levels deep. For example, a hypothetical representative node (the "parent" node) may be connected to the representative node for the entire cluster. Another hypothetical representative node (a "child" node) may be connected to the hypothetical representative node for the hypothetical cluster. This scenario may occur when a significant number of nodes share the common parameters with the parent node of the primary hypothetical cluster but also may be subdivided along other distinct parameters. Thus, the hypothetical clusters may facilitate identification of common groups of parameters among different target deployments at multiple levels of granularity.

In some embodiments, hypothetical clusters may be separated from the main cluster to form a new cluster. For example, a user may sever this sub-cluster along edge 710 to create a new cluster from the sub-set of nodes that belong to the sub-cluster. The center/mode for the subset of nodes may then be assigned as the representative node for the new cluster. The initially selected representative node may remain the representative node for the nodes that were not severed.

In some embodiments, the interface allows a user to change the representative node of a cluster and/or a hypothetical cluster. For example, a user may right click or otherwise select a node in the cluster other than the representative node. The user may then be presented with an option to set the node as the representative node. In response to the selection, the representative node may be changed to the selected node. The visualization may be updated to highlight the new representative node. Additionally or alternatively, one or more edges may be redrawn to connect to the new representative node rather than the previous representative node. This approach may be useful when the optimal configuration is followed by relatively few deployments in the cluster or a new node/deployment is introduced. In these cases, the auto-selected representative node may be updated to match the new node.

4.3 Summary Visualizations and Drill-Down Operations

In some embodiments, a user may drill-down on individual clusters and/or nodes to view more detailed information. For example, the user may select one of clusters 0-3 to view a more detailed interactive visualization for the cluster, such as given in the example below. Additionally or alternatively, a user may select individual nodes to identify which software deployments are associated with a node. For example, selecting a node may cause an identifier to be displayed for each software deployment sharing the configuration corresponding to the node.

Figure 8:
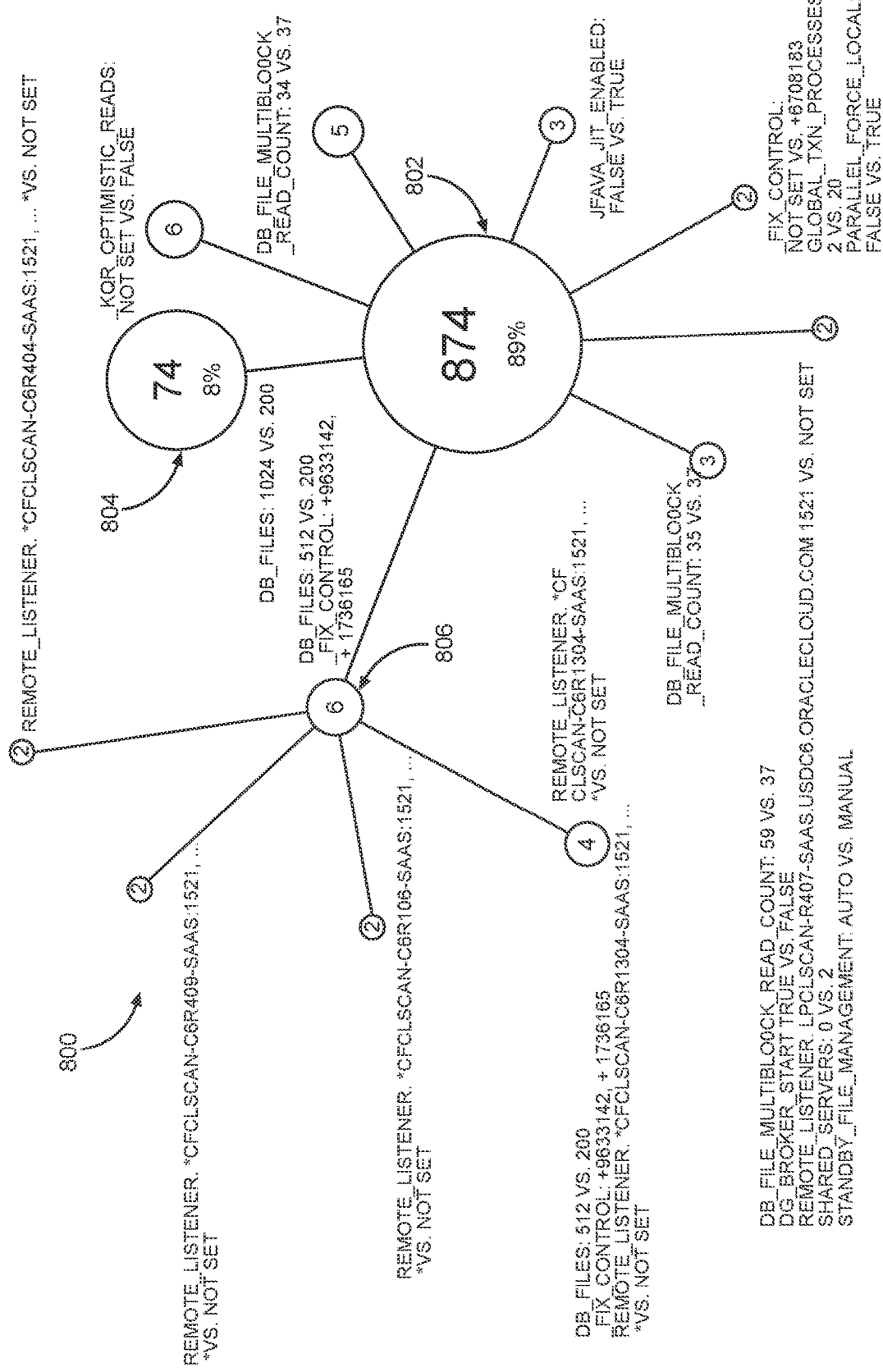
FIG. 8 illustrates an example interactive visualization for a selected cluster, in accordance with some embodiments.

FIG. 8 illustrates example interactive visualization 800 for a selected cluster, in accordance with some embodiments. Interactive visualization 800 displays how many deployments share the feature values corresponding to a node. For example, representative node 802 indicates that the corresponding feature values were detected in 874 deployments, comprising 89% of the deployments in the cluster. The next biggest node (node 804) indicates that the corresponding feature values were detected in 74 different deployments comprising 8% of the software deployments.

In some embodiments, differences in node configuration are displayed next to a node or an edge. Referring to FIG. 8, for example, a summary displayed next to node 804 indicates that there is a difference in the number of database files between the 74 deployments corresponding to this node and the 874 deployments corresponding to representative node 802. A summary displayed next to node 806 indicates that there is a difference in the number of database files and the parameter "_fix_control" between the 6 deployments corresponding to this node and the 874 deployments corresponding to representative node 802. Similarly, summaries are presented next to each other node the identify the differences between deployments corresponding to the node and the deployment corresponding to representative node 802.

In addition or as an alternative to interactive cluster graphs, summary charts may be presented to a user. For example, FIG. 9 illustrates example summary chart 900 for a set of clusters, in accordance with some embodiments. The charts identify the number of deployments in each cluster, the dispersion within each cluster, and the feature values at the center of the cluster. Each cluster may be labelled to highlight the differences. For instance, cluster 2 groups deployments that exhibit high and variable memory. Cluster 0 groups clusters that have high values for cpu_count, and cluster 3 groups clusters with small and variable memory. The information that is displayed in a summary chart may vary depending on the particular implementation. One or more of the attributes displayed in the summary chart may be exposed to and configurable by an end user, thereby allowing for custom summaries to be generated.

In some embodiments, drill-down operations may involve re-clustering a subset of nodes based on different parameters. For example, clusters 0-3 may initially be clustered based on a first set of features, such as a combination of performance parameters. A user may then select one of the clusters or a subset of nodes in a cluster and request that the nodes be re-clustered based on a different set of attributes, such as security attributes or host machine attributes. In response, the nodes of the selected cluster are re-clustered into one or more sub-clusters based on the new set of parameters.

Drill-down operations may be performed to visualize deployment patterns and manage deployed resources across various dimensions. For example, target deployments may initially be clustered based on performance attributes. A cluster corresponding to low-performing deployments may then be re-clustered based on geographic location and/other attributes. This approach allows patterns in low-performing deployments to be visualized and addressed. A user may similarly drill-down across other dimensions, which include any combination of configuration settings for the deployed resources.

4.4 Drag-and-Drop Interface

In some embodiments, the interactive visualizations support a drag-and-drop interface to perform management operations. A drag-and-drop interface allows a user to click on or otherwise select graphical representations, such as icons, of one or more nodes in a cluster. The user may then drag the graphical representations and drop the graphical representations of the one or more nodes to another area of the display. The user may then drop the graphical representations, such as by releasing the clicked button, to initiate one or more management operations on the node. Drag-and-drop may provide an intuitive interface for managing the configuration of a large number of objects.

In some embodiments, one or more management operations are triggered responsive to a user dragging-and-dropping one or more nodes to another node. For example, the user may drag one or more nodes to the representative node or any other node in the cluster. In response, an update operation may be triggered to reconcile the node that was dragged with the representative node. The update operation may involve applying patches and/or adjusting other configuration settings of the node to match the configuration settings of the representative node, as described in further detail below.

Additionally or alternatively, the management operations may be triggered via other interfaces or automatically, depending on the particular implementation. For example, the user may trigger management operations through a menu interface, a CLI, or through any other user interface. The interface may allow a user to initiate several operations in parallel on different deployments with minimal input, such as a drag-and-drop or a single click.

5. Configuration Management

In some embodiments, management operations may be triggered automatically or on-demand based on the results of a clustering process. Example management operations may include:

Initializing new nodes/deployments;
Updating existing nodes/deployments
Remediating drift within clustered nodes
Subscribing nodes to a gold image
Performing analytics; and
Performing troubleshooting.

Example embodiments of management operations are provided below in subsections 5.1 to 5.5

As provided in the examples below, a management operation's functionality may be dependent on one or more values of the features set of the representative node or other characteristics of the representative node, either by causing display of information from the feature set on an interface, for example, in association with the representative node or its cluster, or by using such information to drive the targeted performance of a remedial operation, maintenance operation, or some other operation with respect to the representative node or its corresponding cluster. For example, any operation that requires the cluster to be treated as if it were a single node (e.g., for visualization purposes, to simplify software configuration complexity, or otherwise) could take advantage of one or more values of the feature set of the representative node or any other characteristics of the representative node, even if those characteristics were not used for the purposes of generating the clusters. This information may be provided to the service executing the operation.

5.1 Initializing New Nodes

In some embodiments, the results of a clustering operation may be used to initialize new nodes. If a new deployment of a software resource comes online, then the new deployment may be assigned to a cluster based on the initial parameters. The configuration settings may then be set to match those of the representative node in the cluster.

In some embodiments, initialization of a new node is performed automatically. When a new deployment is first detected, a feature vector may be formed. The feature vector may be used to assign the deployment to a cluster that has a centroid with the shortest distance. The configuration settings of the representative node may then be determined and applied to the new node. For example, the new node may lack one or more patch set updates of the representative node. In this case, a patching process may be triggered on the new node to apply the patch set updates. As another example, the security settings on the new node may be configured to match the representative node, such as by opening or closing network ports, configuring identity and access management policies, and/or updating firewall settings.

In other embodiments, initialization of a new node may be done by request. For example, the user may drag-and-drop a graphical representation of the new node on the representative node or any other node in a cluster. In response, a set of one or more processes may be launched on the new node to initialize the configuration settings to match those of the representative node.

5.2 Updating Nodes and Remediating Drift

In some embodiments, the results of a clustering operation may be used to update nodes in a cluster. For example, a node or group of nodes within a cluster may be updated, either automatically or by request, to match the configuration settings for the representative node or any other node in the cluster. Responsive to receiving a request to update a node or set of nodes, one or more update processes may be instantiated. The update process may apply patches to modify a software binary, execute scripts to modify initialization parameters, or otherwise update configuration settings as described in the previous subsection. Updates on multiple nodes may be executed in parallel.

In some embodiments, update operation may add features to the deployments that were present in the representative node but initially missing from the upgraded nodes. For example, an update operation may add user-defined patches, scripts, or other custom features to a deployment. The clustered set of results may thus be used to update the set of source components from which one or more deployments are run.

In some embodiments, update operations may be performed to remediate configuration drift within a cluster. For example, nodes that belong to the same cluster may be updated, either automatically or by request, to match the configuration of the representative node in the cluster. Drift reconciliation may be applied to a single node in the cluster, to a subset of nodes, or to all the nodes in a cluster. The system may provide the user with a time estimate on the operation. Updates may be scheduled and/or staggered to mitigate downtime.

Figure 10:
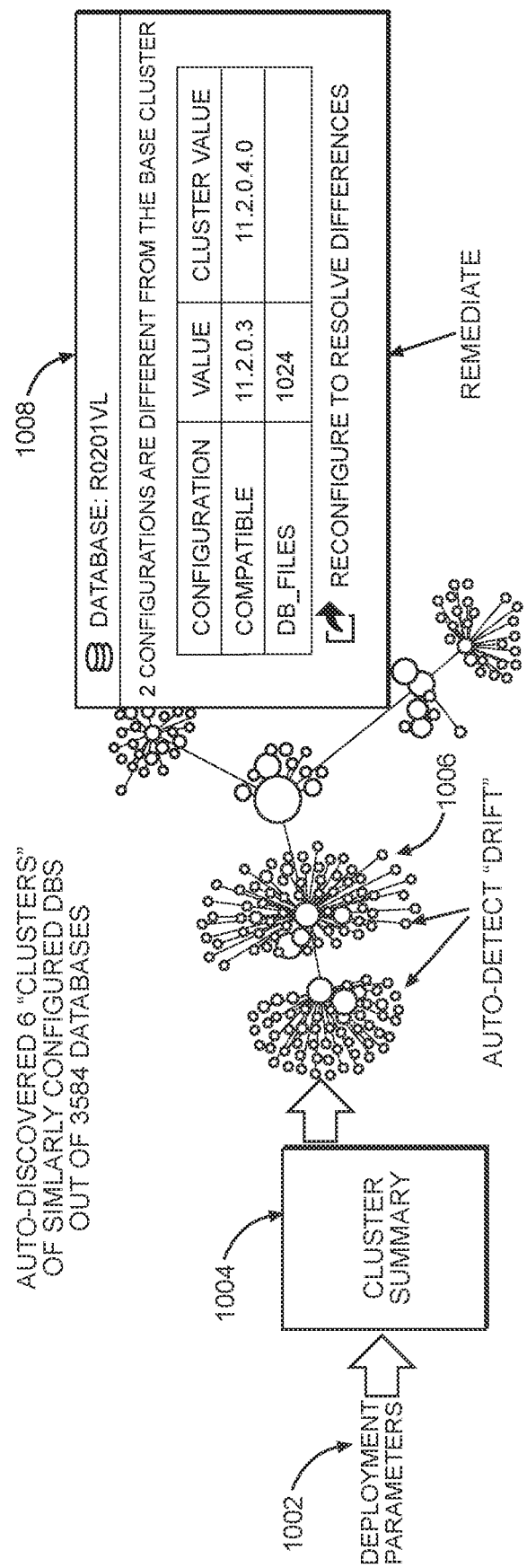
FIG. 10 illustrates an example flow for remediating drift based on a set of clustered deployments in accordance with some embodiments.

FIG. 10 illustrates an example flow for remediating drift based on a set of clustered deployments in accordance with some embodiments. Deployment parameters 1002 are initially received for a plurality of deployments. In response, summary chart 1004 and interactive visualization 1006 may be generated based on the techniques described above. In the example illustrated, 3584 database deployments are grouped into six clusters, although the number of deployments and clusters may vary from implementation to implementation. Interactive visualization 1006 provides an option via GUI window 1008 to remediate the drift within the cluster. The user may select the option to initiate drift remediation. If selected, the database deployments will be updated to match the configuration settings of the gold/representative nodes.

Remediation may be performed globally for all nodes within a cluster or for a subset of nodes therein. In some embodiments, remediation may be performed on a hypothetical cluster basis. As previously described, a hypothetical cluster has a hypothetical representative node that is different than the representative node for the entire cluster. The user may select an option to use the hypothetical representative node to remediate drift in a sub-cluster rather than the global representative node. This approach allows the user to reconcile different sub-clusters using different configuration settings based on how the nodes are organized into sub-clusters.

5.3 Gold Image Subscriptions

In some embodiments, the results of a clustering operation may be used to generate gold image subscriptions. For example, a representative node may be selected, either automatically or by a user, as a gold image for one or more other nodes in the cluster. In response, a set of subscription data is generated that maps the subscribed nodes to the gold image. Once subscribed, the nodes follows changes to the representative node. Thus, an upgrade detected at the representative node may trigger upgrades to subscribed nodes/deployments.

In some embodiments, all nodes within a cluster are subscribed to the representative node for the cluster. However, in other embodiments, different subsets of nodes within a cluster may subscribed to different gold images. For example, nodes that belong to a hypothetical cluster may subscribe to the hypothetical representative node for the sub-cluster rather than the representative node for the entire cluster. In other cases, the user may select a gold image from any of the other existing nodes in the cluster or may create a new gold image node with an new set of features.

5.4 Analytic Operations

In some embodiments, analytic operations may be run over one or more nodes in a cluster to display analytic information about the nodes. Analytic operations may be used to gather insights about target deployments that would not be readily apparent outside of the context of the clustered set of results. As an example, aggregate performance metrics, such as average CPU utilization and memory throughput, may be presented to an end user for a set of nodes that belong to a cluster or sub-cluster. As another example, dispersion rates that present the variability of feature values in a cluster or sub-cluster may be presented. Other analytic operations may also be executed as a function of one or more features of nodes in the clusters.

In some embodiments, analytic operations may be performed to highlight differences between different clusters and/or sub-clusters. Displaying information about a small set of representative nodes may allow for a clearer understanding of the different purposes of the different clusters in the system, where a subset of information about the representative node for each cluster is displayed for the purpose of understanding these differences. For that reason, a presentation of information about different clusters (or hypothetical clusters) may focus on differences. Characteristics shared by all representative nodes (or hypothetical representative nodes) may be excluded from presentation of information.

In some embodiments, analytic information may be presented to a user to facilitate management operations. As an example, in response to a user selecting a node in a cluster, the interactive interface may display information about how the node drifts from the representative node. For instance, the information may include a list of configuration settings that differ from the representative node, such as differences in patch-levels and security settings. Additionally or alternatively, the information may include a cost estimate of reconciling the node with the representative node. The cost estimate may be determined based on the steps required to update the configuration settings of the node to match the representative nodes. The cost estimate may include an estimated time to perform the steps, which may help the user schedule a management operation for at an appropriate time.

5.5 Troubleshooting Operations

Fixing a problem with one node is often easier than fixing an entire cluster. If, through a visualization of the clusters and the representative nodes, a user is able to determine that a particular cluster has a problem, then the user may attempt to troubleshoot the representative node, track configuration changes being made to the representative node, and, when troubleshooting is complete, apply any such changes to the entire cluster. For example, a problem may be detected based on frequently occurring bug reports in the cluster, frequently occurring error logs associated with the cluster, or poor performance metrics for the cluster or based on metrics displayed concurrently with the cluster that indicate the problem. The user may leverage the information presented about the cluster to isolate and address the root cause of the problem.

In some embodiments, the interactive interfaces allow a user to take ameliorative action when attempting to resolve a problem, such a performance degradation or security violations. For example, the user may shut down one or more nodes in a cluster to prevent further security violations. The user may then bring the nodes back online once the problem has been resolved on the representative node. Any configuration changes made on the representative node may be propagated to the other nodes before they are brought back online. For example, the nodes that belong to a cluster may apply any patches, security setting updates, or other configuration changes made to the representative node.

6. Computer Networks and Cloud Networks

In some embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In some embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Microservice Applications

According to some embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other.

These managed applications may be authenticated or plugged in to the microservices manager, for example, with user-supplied application credentials to the manager, without requiring reauthentication each time the managed application is used alone or in combination with other applications.

In some embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to some embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In some embodiments, a plugged-in microservice application may expose actions to the microservices manager. The exposed actions may receive, as input, data or an identification of a data object or location of data, that causes data to be moved into a data cloud.

In some embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In some embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 11:
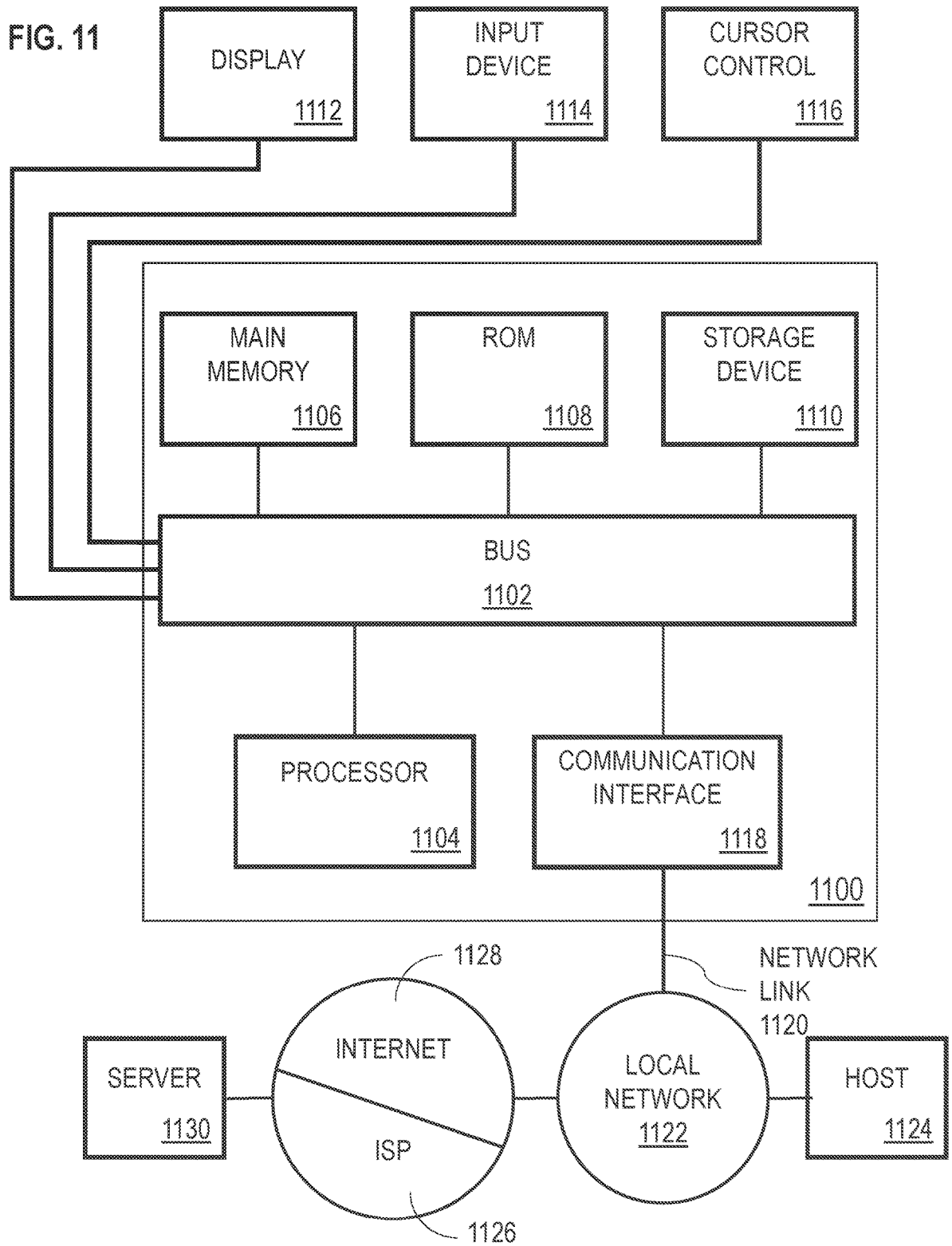
FIG. 11 shows a block diagram that illustrates a computer system in accordance with some embodiments.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1110. Volatile media includes dynamic memory, such as main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

9. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with some embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
applying a machine learning model that generates a set of clusters for target resources in a cloud environment, wherein applying the machine learning model includes selecting, by the machine learning model based on learned patterns in deployments of the target resources, a set of configuration parameters to drive clustering of the target resources in the cloud environment;
identifying for a particular cluster in the set of clusters, based on varying configuration settings of at least a subset of the configuration parameters for target resources in the cloud environment assigned to the particular cluster, a representative node that represents a set of recommended configuration settings for target resources assigned to the particular cluster, wherein the representative node is identified by excluding at least one configuration parameter from the subset of configuration parameters and averaging values for at least the subset of the configuration parameters; and configuring, in the cloud environment, at least one target resource assigned to the particular cluster to match the set of recommended configuration settings.

2. The method of claim 1, wherein the at least one target resource is assigned to the particular cluster by the machine learning model.

3. The method of claim 1, wherein the at least one target resource is assigned to the particular cluster responsive to a user dragging-and-dropping an icon representing the at least one target resource to an area of a screen displaying a representation of at least one node in the particular cluster.

4. The method of claim 1, wherein the cloud environment is one of a software-as-a-service, a platform-as-a-service, or an infrastructure-as-a-service; wherein target resources associated with the software-as-a-service, the platform-as-a-service, or the infrastructure-as-a-service are configured based on the set of clusters.

5. The method of claim 1, wherein the at least one target resource includes a new target resource within the cloud environment; wherein configuring the at least one target resource includes initializing the new target resource to match the one or more configuration settings.

6. The method of claim 5, further comprising: generating a feature vector for the new target resources based on initial parameters associated with the new target resource; and assigning the new target resource to the particular cluster responsive to determining that the feature vector is closer to the particular cluster than other clusters in the set of clusters.

7. The method of claim 1, wherein applying the machine learning model comprises selecting a set of features for clustering based on a trained correlation model.

8. The method of claim 1, wherein applying the machine learning model comprises computing a representative node for the particular cluster based on varying configuration settings for target resources in the cloud environment.

9. The method of claim 1, further comprising: presenting differences in configuration settings for different target resources in the cloud environment that have been assigned to the particular cluster.

10. One or more non-transitory computer-readable media storing instructions which, when executed by one or more hardware processors, cause:

applying a machine learning model that generates a set of clusters for target resources in a cloud environment, wherein applying the machine learning model includes selecting, by the machine learning model based on learned patterns in deployments of the target resources, a set of configuration parameters to drive clustering of the target resources in the cloud environment;

identifying for a particular cluster in the set of clusters, based on varying configuration settings of at least a subset of the configuration parameters for target resources in the cloud environment assigned to the particular cluster, a representative node that represents a set of recommended configuration settings for target resources assigned to the particular cluster, wherein the representative node is identified by excluding at least one configuration parameter from the subset of configuration parameters and averaging values for at least the subset of the configuration parameters; and configuring, in the cloud environment, at least one target resource assigned to the particular cluster to match the set of recommended configuration settings.

11. The media of claim 10, wherein the at least one target resource is assigned to the particular cluster by the machine learning model.

12. The media of claim 10, wherein the at least one target resource is assigned to the particular cluster responsive to a user dragging-and-dropping an icon representing the at least one target resource to an area of a screen displaying a representation of at least one node in the particular cluster.

13. The media of claim 10, wherein the cloud environment is one of a software-as-a-service, a platform-as-a-service, or an infrastructure-as-a-service; wherein target resources associated with the software-as-a-service, the platform-as-a-service, or the infrastructure-as-a-service are configured based on the set of clusters.

14. The media of claim 10, wherein the at least one target resource includes a new target resource within the cloud environment; wherein configuring the at least one target resource includes initializing the new target resource to match the one or more configuration settings.

15. The method of claim 14, wherein the instructions further cause: generating a feature vector for the new target resources based on initial parameters associated with the new target resource; and assigning the new target resource to the particular cluster responsive to determining that the feature vector is closer to the particular cluster than other clusters in the set of clusters.

16. The media of claim 10, wherein applying the machine learning model comprises selecting a set of features for clustering based on a trained correlation model.

17. The media of claim 10, wherein applying the machine learning model comprises computing a representative node for the particular cluster based on varying configuration settings for target resources in the cloud environment.

18. The media of claim 10, wherein the instructions further cause: presenting differences in configuration settings for different target resources in the cloud environment that have been assigned to the particular cluster.

19. A system comprising:

one or more hardware processors; and one or more non-transitory computer-readable media storing instructions which, when executed by the one or more hardware processors, cause:

applying a machine learning model that generates a set of clusters for target resources in a cloud environment, wherein applying the machine learning model includes selecting, by the machine learning model based on learned patterns in deployments of the target resources, a set of configuration parameters to drive clustering of the target resources in the cloud environment;

identifying for a particular cluster in the set of clusters, based on varying configuration settings of at least a subset of the configuration parameters for target resources in the cloud environment assigned to the particular cluster, a representative node that represents a set of recommended configuration settings for target resources assigned to the particular cluster, wherein the representative node is identified by excluding at least one configuration parameter from the subset of configuration parameters and averaging values for at least the subset of the configuration parameters; and configuring, in the cloud environment, at least one target resource assigned to the particular cluster to match the set of recommended configuration settings.

20. The method of claim 1, wherein averaging values for at least the subset of the configuration parameters comprises determining a mode for the subset of configuration parameters; wherein the representative node corresponds to the mode for the subset of configuration parameters.

* * * * *

UNITED STATES PATENT AND TRADEMARK OFFICE
CERTIFICATE OF CORRECTION

PATENT NO. : 12,131,142 B2
APPLICATION NO. : 17/332649
DATED : October 29, 2024
INVENTOR(S) : Garvey et al.

Page 1 of 1

It is certified that error appears in the above-identified patent and that said Letters Patent is hereby corrected as shown below:

In the Claims

In Column 30, Line 21, in Claim 15, delete "method" and insert -- media --, therefor.

Signed and Sealed this
Fourth Day of February, 2025

Coke Morgan Stewart
*Acting Director of the United States Patent and Trademark Office*